W. T. O. RULE.
SAUSAGE LINKING ATTACHMENT.
APPLICATION FILED FEB. 10, 1914.
1,179,222.
Patented Apr. 11, 1916.
2 SHEETS—SHEET 1.
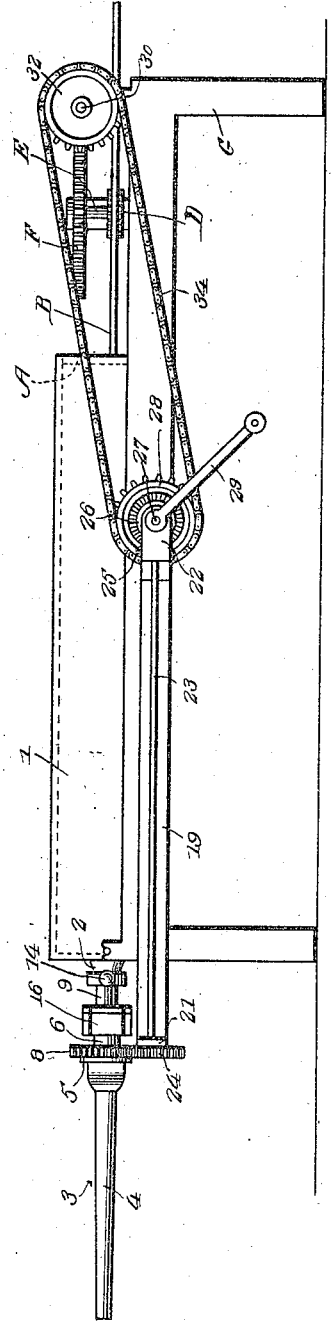
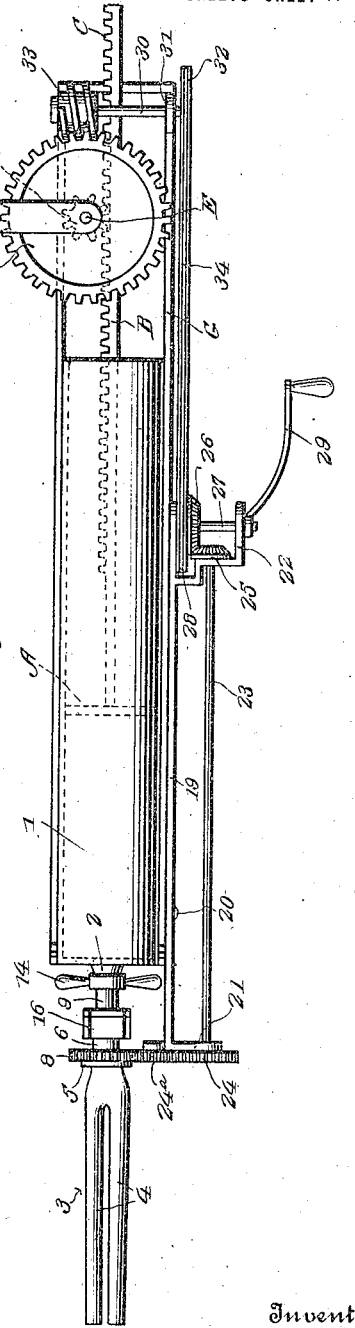
Witnesses
Inventor
W. T. O. Rule,
Attorney

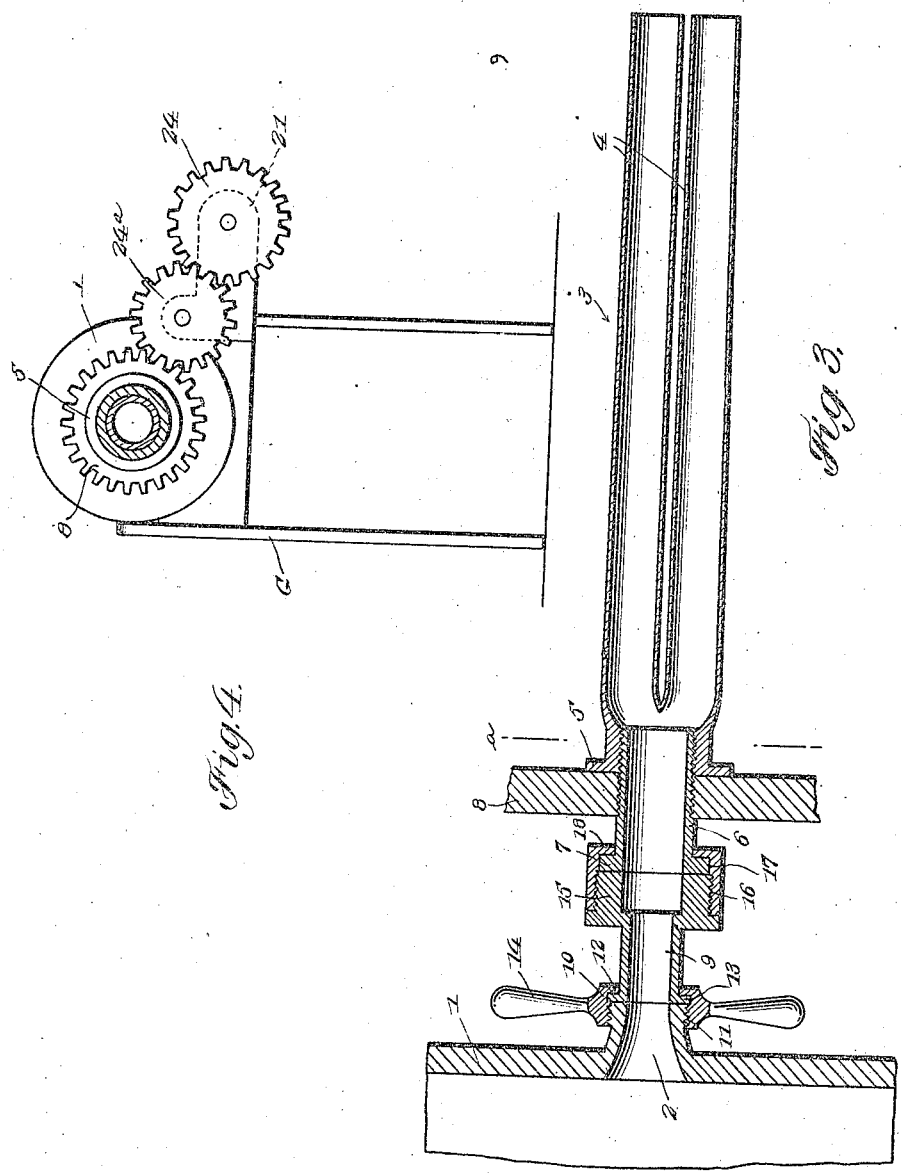

UNITED STATES PATENT OFFICE.

WILLIAM T. O. RULE, OF HAMPTON, IOWA.

SAUSAGE-LINKING ATTACHMENT.

1,179,222.  Specification of Letters Patent.  Patented Apr. 11, 1916.

Application filed February 10, 1914. Serial No. 817,892.

*To all whom it may concern:*

Be it known that I, WILLIAM T. O. RULE, a citizen of the United States, residing at Hampton, in the county of Franklin and State of Iowa, have invented new and useful Improvements in Sausage-Linking Attachments, of which the following is a specification.

This invention is an improved sausage linking attachment for use in connection with a sausage stuffing machine, the object of the invention being to provide an improved device of this character which provides a plurality of casing carrier tubes and means for revolving said tubes to cause the casings to be twisted together after being stuffed and thereby divide the sausages into links, a specific object of the invention being to effect improvements in the construction of the casing carrier tubes, another object being to effect improvements in the means for connecting the casing carrier tubes to the discharge spout of a sausage stuffing machine, another object being to provide improved means for simultaneously rotating the casing carrier tubes and operating the stuffing machine.

The invention consists in the construction, combination and arrangement of devices hereinafter described and claimed.

In the accompanying drawings: Figure 1 is a side elevation of a sausage stuffing machine provided with a sausage linking attachment constructed in accordance with my invention. Fig. 2 is a plan of the same. Fig. 3 is a detail vertical longitudinal central sectional view of the sausage linking attachment. Fig. 4 is a vertical transverse sectional view of the same on the plane indicated by the line *a—a* of Fig. 3.

For the purposes of this specification the cylinder of a sausage stuffing machine is here indicated at 1 and provided at its discharge end with a spout 2. The usual plunger A is indicated in dotted lines in Figs. 1 and 2, provided with a rod B which has rack teeth C on one side engaged by a pinion D on a shaft E, said shaft having a worm gear F. In accordance with my invention I provide a revoluble casing carrier element 3. This casing carrier element consists of a plurality of tubes 4 all of which communicate with and lead from the intake end of the casing carrier, the said tubes 4 being arranged with their axes parallel and being preferably slightly tapered toward their discharge ends. The intake end of the casing carrier is internally threaded and is provided with an outwardly projecting polygonal flange 5 which may be readily grasped by a wrench to enable the carrier to be attached to or detached from the tubular shaft 6, said shaft being exteriorly threaded to engage the threads in the intake end of the casing carrier and being provided at its inner end with an annular flange 7. A spur gear 8 is also screwed or otherwise suitably secured on the tubular shaft and bears against the inner end of the casing carrier.

A tubular sleeve 9 is detachably fitted to the discharge end of the spout 2, arranged in line therewith and secured to said spout by means of a collar 10 which has threaded engagement with the spout as at 11 and which has at the outer side an annular flange 12 which engages a flange 13 at the inner end of the tubular shaft 9. Thereby the said collar 10 securely and yet detachably connects the clamping collar to the discharge spout of the stuffing machine. The clamping collar 10 is here shown as provided with radial arms 14 to enable it to be readily manually screwed on or unscrewed from the discharge spout, to attach or detach the tubular shaft and the linking mechanism. The outer end of the tubular shaft 9 is diametrically enlarged as at 15 and exteriorly threaded the threads thereof being engaged by a collar 16. The said collar forms a bearing 17 for the inner end of the sleeve 6 and is provided with an annular inwardly extending flange 18 that engages the outer side of the flange 7. Hence the tubular shaft is swivelly connected to the sleeve 6 so that said shaft may rotate with the gear 8 and the casing carrier element.

I also in accordance with my invention provide a frame 19 which is adapted to be readily attached to one side of the main frame G of the sausage stuffing machine as by means of bolts 20. This frame 19 has an outwardly extending arm 21 at one end, where the frame 19 projects beyond the discharge end of the sausage stuffing machine and said frame 19 has a bent arm 22 at its opposite end. A shaft 23 which is horizontally arranged and extends longitudinally of the frame 19 has its bearings in the arms 21 and 22 and is provided at its outer end with a spur gear 24 which engages an idler gear 24ª, said idler gear engaging the gear 8. At the opposite end of said shaft 23 is a beveled gear 25 which is engaged by a similar gear 26 on a driving shaft 27 which is arranged at right angles to the shaft 23 and has its bearings in the frame 19 and in the arm 22. A sprocket wheel 28 is secured on the shaft 27 and said shaft also has a crank 29 or other suitable device by means of which it may be readily revolved. A shaft 30 which is mounted in a bearing 31 on the frame G of the sausage stuffing machine has a sprocket wheel 32 and is also provided with a worm 33, said worm engaging the worm gear F of the stuffing machine. An endless sprocket chain 34 connects the sprocket wheels 28 and 32.

The operation of my invention is as follows:—The cylinder 1 of the sausage stuffing machine is filled with sausage meat in the usual way, the plunger A having been first withdrawn and the said plunger is then reinserted in the cylinder and its rack B engaged with the pinion D. The shaft 27 is then revolved either manually or by power. The sprocket wheels and chain and the worm gear cause the plunger to be moved forwardly in the cylinder so as to force sausage meat through the spout 2 and from thence through the sleeve 9 and tube shaft 6 to and through the casing carrier. The shaft 23 being geared to the shaft 27 is also revolved and the gears 24 and 8 cause the casing carrier to revolve continuously during the operation of the sausage stuffing machine. The casings are placed on the tubes of the revolving casing carrier and hence become stuffed with the sausage meat and when a sufficient length of the casings have been stuffed to form sausage lengths the operator by a slight pressure of the thumb and forefinger upon the casings at the outer end of the casing carrier causes a slight subdivision of the meat therein and momentarily arrests the turning movement of the casings with the casing carrier, and as the latter continues to revolve twists are formed in the portions of the casings where such divisions are made thereby forming the links in the sausage and twisting the casings together.

My improved linking attachment may be readily attached to and may be readily removed therefrom so that all parts may be kept clean and in order and the parts of my linking attachment may be readily assembled and disassembled.

Having thus described my invention, I claim:—

In a device of the kind described, in combination a cylinder, a tubular shaft rotatably mounted upon said cylinder, said shaft being externally threaded, a gear wheel having an internally threaded bore into which said shaft is threaded and in advance of which it projects, a collar threaded upon the projecting end of said tubular shaft and having an integral flange jammed against said gear and integrally formed upon said collar and communicating with said collar.

In testimony whereof I affix my signature in presence of two witnesses.

WILLIAM T. O. RULE.

Witnesses:
SHERWOOD A. CLOCK,
R. L. SALEY.